R. HUFF.
BAND CLUTCH.
APPLICATION FILED FEB. 25, 1909.

998,516.

Patented July 18, 1911.
2 SHEETS—SHEET 1.

Witnesses
J. G. Hinkel
B. C. Rust

Inventor
Russell Huff
By
Foster, Freeman, Watson & Cait
Attorneys

R. HUFF.
BAND CLUTCH.
APPLICATION FILED FEB. 25, 1909.
998,516.
Patented July 18, 1911.
2 SHEETS—SHEET 2.
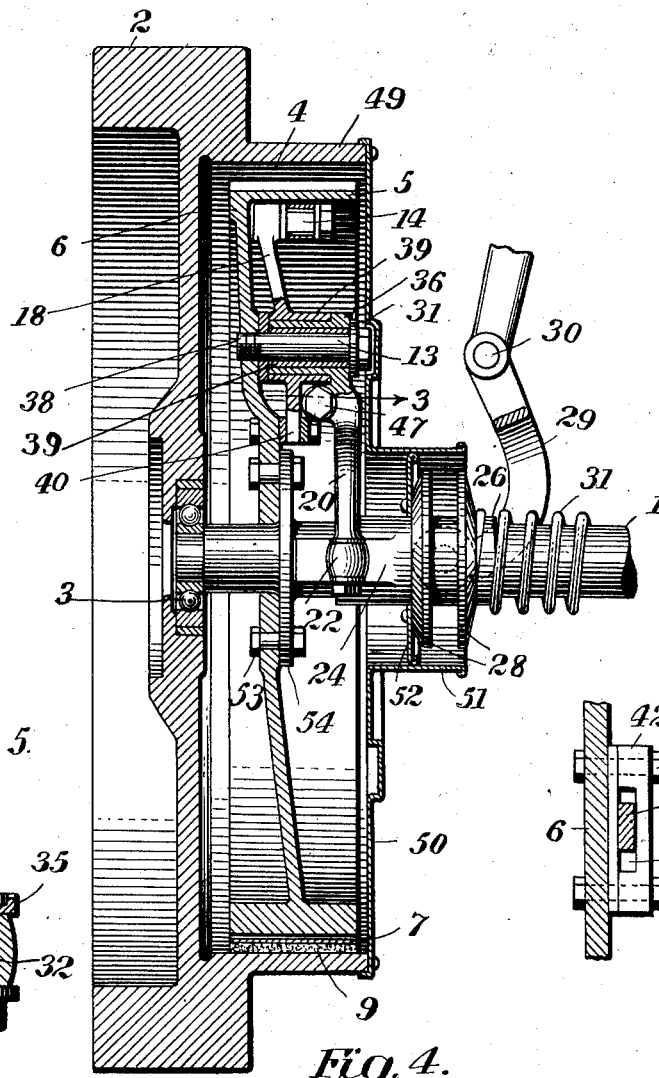
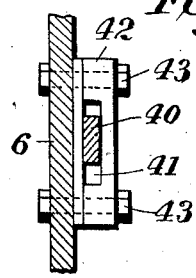
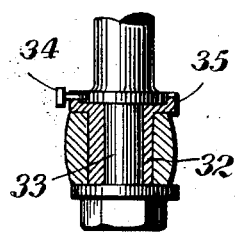
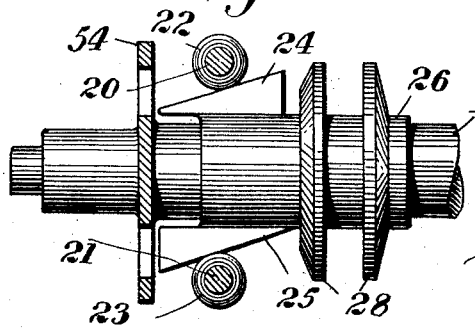

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

BAND-CLUTCH.

998,516.     Specification of Letters Patent.     Patented July 18, 1911.

Application filed February 25, 1909. Serial No. 479,966.

*To all whom it may concern:*

Be it known that I, RUSSELL HUFF, a citizen of the United States, and resident of Detroit, in the county of Wayne and State of Michigan, have invented certain new and useful Improvements in Band-Clutches, of which the following is a specification.

This invention relates to band clutches, and is shown applied to the driven shaft and fly wheel of a motor vehicle, but it will be understood that its features of construction are applicable to other uses. Its object is to improve the means for operating the clutch, and it consists in the novel features, which will be apparent from the following description, taken in connection with the drawings.

Figure 1:
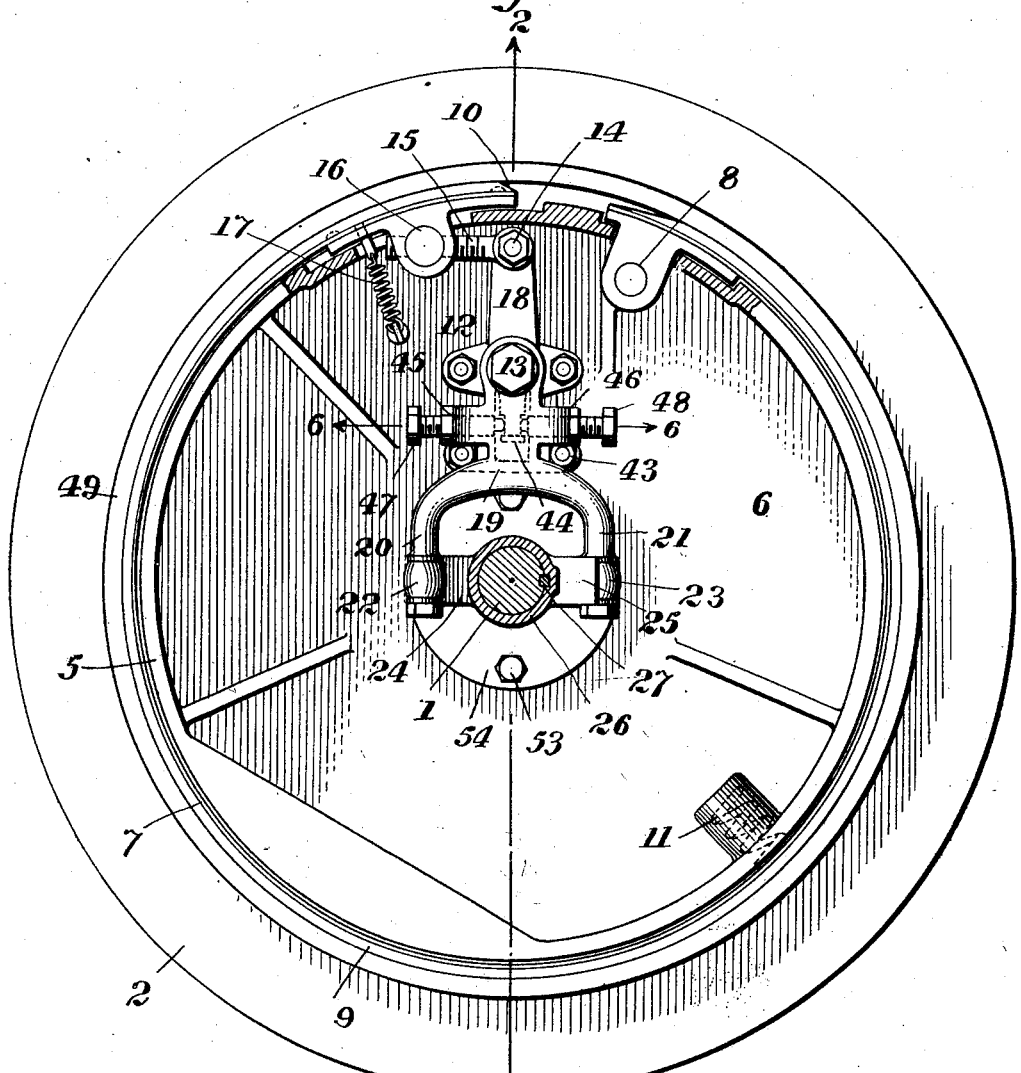
Figure 6:
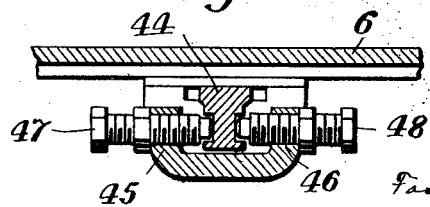

In the drawings:—Figure 1 is an elevation partly in section showing a device having my invention applied thereto; Fig. 2 is a sectional view upon the line 2—2, of Fig. 1; Fig. 3 is a sectional view upon the line 3—3 of Fig. 2; Fig. 4 is an enlarged detail view of the operating sleeve and wedges; Fig. 5 is an enlarged sectional view of an adjustable roller on the operating lever; and Fig. 6 is a sectional view upon the line 6—6 of Fig. 1.

In the drawings, 1 represents the driven shaft of a motor vehicle and 2 represents the fly wheel, which is adapted to be connected to the driven shaft by my improved clutch mechanism hereafter described. At the end of the shaft 1 there is a ball bearing connection 3 between it and the fly wheel. The fly wheel 2 has a cylindrical portion provided with an interior brake surface 4, and a clutch drum 5 is mounted within this brake surface and adjacent thereto, this clutch drum being connected to the shaft 1 by the web 6 which is secured by bolts 53, to the flange 54 formed on the shaft 1. A steel band 7 made in the form of a split ring surrounds the drum 5, and one end of this band is anchored to the web 6 at 8. This band is provided with a suitable covering, such as leather, 9, adapted to engage the surface 4 and clutching the parts together, so as to make the drum 5 and the fly wheel 2 move together. The free end 10 of the clutch band 7 is adapted to be moved positively into and out of engagement with the surface 4 by means hereafter described, and in order to prevent the shocks and jars which would result from having the free end of the band first make contact with the surface 4, a spring 11 is secured to the drum 5 and bears outwardly upon the band at a point nearer its anchored end, whereby the band will commence to make contact with the surface 4 near its anchored end and this contact will gradually extend to the free end of the band.

The free end of the band 7 is operated by a lever 12 pivotally mounted at 13 and having pivotally secured to its upper end at 14 a connecting link 15, which is screw threaded and adapted to pass through an opening made laterally in the pivot pin 16, which is secured to the free end of the band 7. A spring 17 is secured to the web 6 and to the free end of the band, thereby tending to draw the band in against the drum and out of contact with the surface 4. The lever 12 is made up of two relatively movable sections 18 and 19, the lower section 19 being bifurcated and the two arms 20, 21 of this section being provided at their lower ends with rollers 22, 23, adapted to engage upon opposite sides the wedges 24, 25 which together constitute a parallel sided cam surface carried by the sleeve mounted to slide longitudinally on the shaft 1. The sleeve 26 is keyed to the shaft 1, so that it will rotate therewith, as shown at 27, and this sleeve has the circular flanges 28 forming a channel to engage the end of the operating lever 29 pivoted at 30. It will be understood that this lever is adapted to move the sleeve 26 longitudinally of the shaft 1, while that shaft is rotated, and that the spring 31 tends to force the sleeve inward toward the fly wheel, thus moving the clutch band 7 outward against the surface 4. In order to make the rollers 22 and 23 properly fit the wedges 24, 25, these rollers are mounted on eccentric sleeves 32, which are rotatable on the ends 33, of the arms 20, 21. These sleeves may be adjusted to proper position by screws 34 engaging in notches 35 in the sleeves. This adjustability of the rollers makes it possible to compensate for wear, and to bring them into proper engagement with the cam surface on both sides.

By reference particularly to Fig. 2, it will be seen that the section 19 of the operating lever 12 is made with an upper cylindrical portion 36 which surrounds the sleeve 37 carried by the pin 13 which is rigidly secured to the web 6 by screw thread 38. The section 18 is provided with a cylindrical portion 39 mounted upon the cylindrical portion 36, the parts being adapted for relative rotation and for rotation on the pin 13. The section 18 is furthermore provided with an extension or arm 40 projecting downwardly from the cylindrical portion 39 and working in a slot 41 formed by the guide piece 42 secured by bolts 43 to the web 6. This extension working in the guide tends to retain the section 18 in proper position, notwithstanding the strains to which it is subjected and to strengthen it. The section 18 is furthermore provided on the sleeve 39 with a downwardly extending projection or portion 44 which is behind and arranged centrally of the section 19. The section 19 is provided with the laterally extending arms 45, 46, which extend to the sides of the projecting portion 44, and which are provided with the set screws 47, 48, adapted to engage depressions in the end of the part 44. It will be observed that by adjusting the screws 47, 48, the angular relations of the sections 18 and 19 may be varied, and that therefore the movement which is imparted to the clutch band 7 may be regulated and the parts may be adjusted to give exactly the amount of motion desired.

On the end of the cylindrical portion 49 of the fly wheel I preferably place a dust guard 50 made in the shape of a plate extending over the clutch mechanism and having at its central part a cylindrical extension 51 which surrounds the driven shaft 1 and the sleeve 26. Within this cylindrical portion 51 a disk 52 is secured to the flange 28 so as to accurately fit and close the cylindrical opening. It will be understood that the disk 52 moves longitudinally within the cylindrical portion 51 when the sleeve 26 is moved. It may be made in two sections to fit around the sleeve.

The clutch is normally thrown to clutching position by means of the spring 31. By operating the lever 29, which is usually a foot operated lever, the collar 28 is moved to the right, and the parallel sided cam members 24, 25 will swing a lever 12 about the pin 13 as an axis in a clockwise direction so as to unclutch the band 5 from the brake surface 4. When the clutch is released the spring 31 will, through the train of mechanism described, move the lever 12 in a counter-clockwise direction so as to clutch the band 5 to the brake surface 4.

Having thus described the invention, what is claimed is:

1. In a device of the class described the combination with a rotatable shaft, of a split ring clutch carried thereby, a pivoted arm connected at one end to contract and expand said split ring and having its other end bifurcated, and a sleeve slidably mounted on said shaft provided with parallel inclined surfaces upon opposite sides engaging said bifurcated end to turn the arm upon its pivot.

2. In a device of the class described, the combination with a rotatable shaft, of a split ring clutch carried thereby, a pivoted arm mounted to rotate with said shaft and connected at one end to contract and expand said split ring, a forked extension at the other end of said arm embracing the shaft, a sleeve within the forked extension mounted to rotate with but slide longitudinally of said shaft, and parallel longitudinal inclined surfaces upon opposite sides of said sleeve engaging said forked extension to move it.

3. In a device of the class described, the combination with a rotatable shaft, of a split ring clutch carried thereby, a pivoted arm connected at one end to contract and expand said split ring and having its other end bifurcated, a sleeve slidably mounted on said shaft provided with parallel inclined surfaces upon opposite sides engaging said bifurcated end to turn the arm upon its pivot, a spring on said shaft tending to move said sleeve in one direction, and manual operated means for moving it in the other direction.

4. In a device of the class described, the combination with a rotatable shaft, of a split ring clutch carried thereby, a pivoted arm connected at one end to both contract and expand said split ring when turned upon its pivot, means engaging the other end of said arm for turning it, and means for varying the angular relation of the ends of said arm.

5. In a device of the class described, the combination with a rotatable shaft, of a split ring clutch carried thereby, a pivoted arm connected at one end to both contract and expand said split ring when turned upon its pivot, means engaging the other end of said arm for turning it, and means adjacent the pivot for securing the two ends of said arm together in different adjusted angular positions.

6. In a device of the class described, the combination with a rotatable shaft, of a split ring clutch, a lateral support for said clutch carried by said shaft, an arm formed in two sections pivotally connected together and to said support, means for connecting said sections together so that they will turn together on the pivot, means for adjusting said sections relatively and for locking said sections in adjusted position, connections upon one section for operating the clutch, and means engaging the other section for turning the arm upon its pivot.

7. In a device of the class described, the combination with a rotatable shaft, of a split ring clutch, a lateral support for said clutch carried by said shaft, an arm formed in two sections having transverse telescoping pivotal connection, means for adjusting and retaining said sections in different angular positions, means for pivotally mounting said arm upon the support, connections at one end of said arm for operating the clutch, and means at the other end for turning the arm upon its pivot.

8. In a device of the class described, the combination with a rotatable shaft, of a split ring clutch, a lateral support for said clutch carried by said shaft, an arm formed in two sections having transverse telescoping pivotal connection, means for adjusting and retaining said sections in different angular positions, a pivot pin passing through said pivotal connection and pivotally securing said arm to the lateral support, connections at one end of said arm for operating the clutch, and means at the other end for turning the arm upon its pivot.

9. In a device of the class described, the combination with a rotatable shaft, of a split ring clutch, a lateral support for said clutch carried by said shaft, an arm formed in two sections having transverse telescoping pivotal connection, an extension on one section, screws carried by the other section and engaging said extension to adjust the sections to different angular positions, a pivot pin passing through said pivotal connection and pivotally securing said arm to the lateral support, connections at one end of said arm for operating the clutch, and means at the other end for turning the arm upon its pivot.

10. In a device of the class described, the combination with a rotatable shaft, of a split ring clutch, a lateral support for said clutch carried by said shaft, an operating arm pivoted to said support, means engaging one end of said arm for turning it upon its pivot, a screw threaded link arm pivotally connected to said arm at the other end, and a transverse pivot pin secured to the free end of said split ring clutch provided with a screw threaded opening to receive said screw threaded link arm.

11. In a device of the class described, the combination with a split ring clutch anchored at one end, of a swinging operating arm, a pin mounted in bearings at the free end of said split ring clutch and provided with a transverse screw threaded opening, and a link arm pivotally secured to said swinging arm and provided with a screw threaded end engaging the screw threads of said opening in the pin.

12. In a device of the class described, the combination with a support, of a pivot pin secured thereto, an arm having a cylindrical bearing surrounding said pin, a second arm having a cylindrical bearing surrounding the bearing of the first arm, and means for securing said arms together in adjusted position whereby they will rotate together on said pin.

13. In a device of the class described, the combination with a support, of a pivot pin secured thereto, an arm having a cylindrical bearing surrounding said pin, a second arm having a cylindrical bearing surrounding the bearing of the first arm, an extension on one arm, a bifurcated section of the second arm embracing the extension of the first arm, and adjusting bolts in said bifurcated section engaging said extension.

14. In a device of the class described, the combination with a support, of a pivot pin secured thereto, an arm having a cylindrical bearing surrounding said pin a second arm having a cylindrical bearing surrounding the bearing of the first arm a bifurcated section on one arm embracing a portion of the other arm, and adjusting bolts in said bifurcated section for securing said arms together.

15. In a device of the class described, the combination with a support, of a pivot pin secured thereto, an arm having a cylindrical bearing surrounding said pin, a second arm having a cylindrical bearing surrounding the bearing of the first arm, a bifurcated section on one arm embracing a portion of the other arm, adjusting bolts in said bifurcated section for securing said arms together, a guide on said support, and an extension on one of said arms working in said guide.

16. In a device of the class described, an operating arm made in two sections having transverse telescoping portions pivotally securing them together, a projection on one of said telescoping sections embraced by a bifurcated portion of the other arm, and adjusting means for securing said projection and bifurcated portion in different angular positions.

17. In a device of the class described, the combination with a pivoted operating arm having a forked end, a parallel sided operating cam working in said forked end, rollers on said end engaging opposite sides of said cam, and adjustable eccentric bearings for said rollers.

18. In a device of the class described, the combination with a rotary shaft, of a clutch drum secured thereto by a web, a clutch band carried by said drum, an operating arm having a bifurcated end pivoted to said web, and a slidable sleeve on said shaft having parallel sided cam surfaces engaging said bifurcated end, the said web being provided with openings to receive the ends of said cam surfaces.

19. In a device of the class described, the combination of a shaft, a wheel, a clutch member carried by the shaft and adapted to engage said wheel, a lever for shifting the clutch member having a bifurcated member embracing the shaft, and a sleeve movable longitudinally on the shaft through said bifurcated section of the lever and provided with means to positively rock said lever in opposite directions to engage or disengage the clutch member and wheel.

20. In a device of the class described, the combination of a shaft, a wheel, a clutch member carried by the shaft and adapted to engage said wheel, a lever for shifting the clutch member having a bifurcated member embracing the shaft, and a sleeve movable longitudinally on the shaft and provided between the members of the bifurcated section of said lever with diametrically oppositely arranged, parallel, longitudinally inclined surfaces, whereby the lever will be positively moved in opposite directions by reciprocation of the sleeve.

In testimony whereof I affix my signature in presence of two witnesses.

RUSSELL HUFF.

Witnesses:
   HOWARD HARKNESS,
   E. N. HEARN.

---

Copies of this patent may be obtained for five cents each, by addressing the "Commissioner of Patents, Washington, D. C."